(12) United States Patent
Kozuma et al.

(10) Patent No.: US 10,604,086 B2
(45) Date of Patent: Mar. 31, 2020

(54) DECORATION MEMBER AND DOOR HANDLE FOR VEHICLE USING THE SAME

(71) Applicants: HONDA LOCK MFG. CO., LTD., Miyazaki-shi, Miyazaki (JP); HONDA MOTOR CO., LTD., Minato-Ku, Tokyo (JP)

(72) Inventors: Hiroyuki Kozuma, Miyazaki (JP); Naoki Okada, Miyazaki (JP); Minoru Shibutani, Miyazaki (JP); Jun Kamioka, Miyazaki (JP); Hidenobu Yasuda, Wako (JP); Yuta Orikasa, Wako (JP)

(73) Assignees: Honda Lock Mfg. Co., Ltd., Miyazaki (JP); Honda Motor Co., Ltd., Tokyo (JP)

( * ) Notice: Subject to any disclaimer, the term of this patent is extended or adjusted under 35 U.S.C. 154(b) by 13 days.

(21) Appl. No.: 16/033,701

(22) Filed: Jul. 12, 2018

(65) Prior Publication Data
US 2019/0016278 A1   Jan. 17, 2019

(30) Foreign Application Priority Data

Jul. 13, 2017   (JP) .................................. 2017-137050

(51) Int. Cl.
*B60R 13/04*  (2006.01)
*E05B 85/10*  (2014.01)
(Continued)

(52) U.S. Cl.
CPC .............. *B60R 13/04* (2013.01); *E05B 85/10* (2013.01); *E05B 17/0004* (2013.01); *E05B 81/77* (2013.01); *E05B 85/14* (2013.01)

(58) Field of Classification Search
CPC ....................................................... B60R 13/04
(Continued)

(56) References Cited

U.S. PATENT DOCUMENTS 9,279,272 B2 *   3/2016   Noda ..................... E05B 81/77
2008/0018127 A1 *   1/2008   Schindler .......... B29C 45/14639
296/1.02

(Continued)

FOREIGN PATENT DOCUMENTS

CN   104847192 A   8/2015
CN   204960585 U   1/2016
(Continued)

OTHER PUBLICATIONS

Machine Translation of JP09-314590A, printed from the EPO website, Oct. 1, 2019.*

(Continued)

*Primary Examiner* — Jason S Morrow
(74) *Attorney, Agent, or Firm* — Carrier Blackman & Associates, P.C.; Joseph P. Carrier; William D. Blackman

(57) ABSTRACT

A decoration member includes a base member having a design surface, and a film material that covers the design surface, wherein the base member has an edge portion that sharpens toward a tip portion when seen in a normal direction of the design surface, and a paste wall section on which the film material is able to be pasted while protruding away from the design surface is formed on a surface of the edge portion opposite to the design surface.

5 Claims, 6 Drawing Sheets

(51) Int. Cl.
*E05B 17/00* (2006.01)
*E05B 85/14* (2014.01)

(58) Field of Classification Search
USPC .......................................................... 296/1.08
See application file for complete search history.

(56) References Cited

U.S. PATENT DOCUMENTS

| | | | |
|---|---|---|---|
| 2011/0025522 A1* | 2/2011 | Peschl | E05B 81/76 340/686.6 |
| 2012/0315430 A1 | 12/2012 | Roberts et al. | |
| 2013/0169004 A1* | 7/2013 | Yamamoto | B60R 13/02 296/191 |
| 2014/0204599 A1* | 7/2014 | Miura | B60Q 1/2661 362/501 |
| 2016/0176362 A1* | 6/2016 | Horst | B60R 13/02 296/1.08 |
| 2019/0143369 A1* | 5/2019 | Lin | C23C 18/38 427/532 |
| 2019/0169893 A1* | 6/2019 | Scheiern | E05B 81/77 |

FOREIGN PATENT DOCUMENTS

| | | |
|---|---|---|
| DE | 60 2005 005 388 T2 | 3/2009 |
| JP | 09-314590 A | 12/1997 |
| JP | 2010-174562 A | 8/2010 |
| JP | 2011-039027 A | 2/2011 |

OTHER PUBLICATIONS

Office Action dated Jun. 4, 2019 issued in the corresponding Japanese Patent Application No. 2017-137050 with the English translation thereof.

Office Action, dated Nov. 28, 2019, issued over the corresponding Chinese Patent Application No. 201810761836.1 with the English translation of the Search Report portion only.

* cited by examiner

DECORATION MEMBER AND DOOR HANDLE FOR VEHICLE USING THE SAME

CROSS-REFERENCE TO RELATED APPLICATION

Priority is claimed on Japanese Patent Application No. 2017-137050, filed Jul. 13, 2017, the content of which is incorporated herein by reference.

BACKGROUND OF THE INVENTION

Field of the Invention

The present invention relates to a decoration member and a door handle for a vehicle using the same.

Description of Related Art

A detection member such as a capacitive sensor or the like may be installed in an outside door handle (hereinafter, simply referred to as "a door handle") disposed on a door for a vehicle. In such a door handle, locking or unlocking of a door lock mechanism is performed by detecting that a user touches the door handle using a detection member.

In the above-mentioned door handle, in order to secure detection accuracy by the detection member, a portion configured to cover the detection member in the door handle needs to be formed of an insulating material.

Meanwhile, since the door handle is a part that constitutes an exterior of the vehicle, it has a high design requirement.

Here, for example, Japanese Unexamined Patent Application, First Publication No. 2011-39027 (hereinafter, Patent Literature 1) discloses a configuration in which a design cover on a door handle surface is constituted by a metallic tone molded sheet including a metal layer formed in a metal body dispersed structure. In Patent Literature 1, a cover main body is formed on a sheet formed product constituted by a metallic tone molded sheet through film insert molding.

The film insert molding has merits such as that it enables decoration to be performed even in products of deep drawing in comparison with film in-mold molding. Meanwhile, in the film insert molding, there is a forming limitation such as limitation of a decoration range of a metal layer within a range to a mating surface (P/L) of a forming die, or the like.

SUMMARY OF THE INVENTION

In recent times, in addition to the above-mentioned various forming methods, formation of a door handle through three-dimension overlay method (TOM) has been under investigation. The TOM is a process of pasting a film material on a base member surface in a chamber held under a reduced-pressure atmosphere, and then increasing a pressure in a space disposed on the side of a film material with respect to the base member (a pressure forming process).

Accordingly, a film material is closely attached to the base member.

In the TOM, molded articles are retrieved from a film material by trimming the film material that goes around to a back surface of the base member during the pressure forming process in a state in which a part of the film material is pasted to the back surface (a state in which a pasting margin on the back surface is secured). However, when there is an acute portion (hereinafter referred to as "an edge portion") on the base member, portions of the film material disposed at both sides with the edge portion sandwiched therebetween may overlap each other before the portions of the film material are closely attached to the back surface of the base member. Then, when trimming is performed to remove the overlapping portion, since the film material is trimmed along an outer circumferential edge (a boundary portion between a surface and a back surface) of the base member at the edge portion, the pasting margin of the film material cannot be secured. As a result, when the door handle is exposed to, for example, a high temperature and high humidity environment or the like and the film material is exfoliated from the base member, the exfoliation of the film material at the edge portion is likely to advance to a surface of the base member. As a result, exterior inferiority may occur.

In consideration of the above-mentioned circumstances, an aspect according to the present invention is directed to providing a decoration member and a door handle for a vehicle using the same that are capable of suppressing occurrence of exterior inferiority and improving a yield rate.

In order to solve the above-mentioned problems, the present invention employs the following aspects.

(1) A decoration member according to an aspect of the present invention includes a base member having a design surface; and a film material that covers the design surface, wherein the base member has an edge portion that sharpens toward a tip portion when seen in a normal direction of the design surface, and a paste wall section on which the film material is able to be pasted while protruding away from the design surface is formed on a surface of the edge portion opposite to the design surface.

According to the aspect of (1), for example, when the film material is pasted on the base member through TOM, the film material that goes around to a surface of the edge portion facing a side opposite to the design surface of the base member (hereinafter referred to as "a back surface") is closely attached to the paste wall section. Accordingly, even when an overlapping portion of the film material on the edge portion occurs, the overlapping portion can be kept away from the outer circumferential edge of the base member (a boundary portion between the design surface and the back surface). For this reason, even when the decoration member is exposed to a high temperature and high humidity environment or the like and exfoliation of the film material occurs, progress of the exfoliation of the film material to the design surface of the base member on the edge portion can be suppressed. As a result, occurrence of exterior inferiority can be suppressed and a yield rate can be improved.

(2) In the aspect of (1), a notch that is cut out toward the design surface may be formed in the paste wall section.

In the case of the aspect of (2), for example, in TOM, after trimming of the film material, even when a part of the film material that sticks out of the paste wall section remains, the sticking out portion can be accommodated in the notch. Accordingly, when the sticking out portion is bonded to the base member through thermo-compression bonding or the like, the sticking out portion is easily pasted on the base member.

(3) In the aspect of (1) or (2), the base member and the film material may be formed of an insulating material.

In the case of the aspect of (3), for example, even when the detection member such as a capacitive sensor or the like is covered with the decoration member, it is possible to suppress the influence on sensitivity of the detection member due to the decoration member.

(4) A door handle for a vehicle according to an aspect of the present invention is a door handle for a vehicle installed on a door for a vehicle, and the decoration member of the aspects is installed on a surface of the door handle.

According to the aspect of (4), since the decoration member according to any one aspect of (1) to (3) is employed in the door handle for a vehicle, it is possible to provide the door handle for a vehicle having a high yield rate with a good appearance.

According to the aspect of the present invention, occurrence of exterior inferiority can be suppressed and a yield rate can be improved.

DETAILED DESCRIPTION OF THE INVENTION

Hereinafter, an embodiment of the present invention will be described with reference to the accompanying drawings. In the embodiment, a case in which a decoration member according to the present invention is applied to a door handle for a vehicle will be described. Directions of forward, rearward, leftward, rightward, and the like described below are the same as directions in a vehicle described below unless the context clearly indicates otherwise. In addition, an arrow UP showing an upward direction with respect to a vehicle and an arrow FR showing a forward direction with respect to a vehicle are provided.

Figure 1:
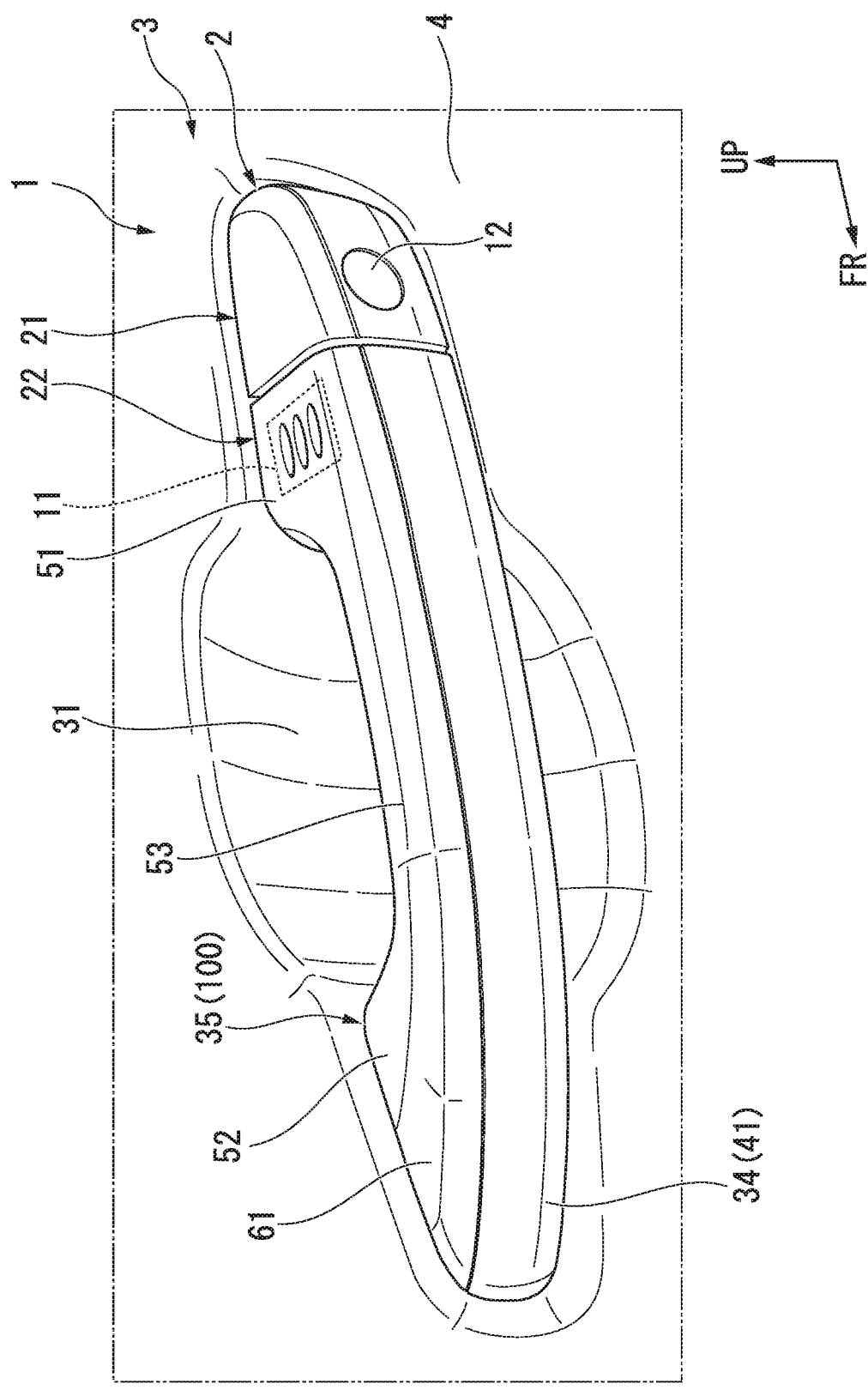
FIG. 1 is a perspective view of a part of a vehicle including a door handle according to an embodiment.

FIG. 1 is a perspective view of a part of a vehicle 1 including a door handle 2.

As shown in FIG. 1, the door handle 2 of the embodiment is installed on a door 3 of the vehicle 1 in a state in which the door handle protrudes outward from an outer panel 4 in a vehicle width direction.

The door handle 2 is formed in an arch shape extending in a forward/rearward direction and having a swelling amount in the vehicle width direction that gradually increases toward a central section in the forward/rearward direction. Specifically, the door handle 2 includes a base 21 fixed to an outer panel of the door 3 and a handle main body 22 gripped by a user, which are split in the forward/rearward direction.

The base 21 is formed on an outer surface of the outer panel 4 while protruding outward in the vehicle width direction. A key cylinder 12 is installed inside the base 21. The key cylinder 12 is linked to a door lock mechanism (not shown). Further, the door handle 2 may have a configuration in which the key cylinder 12 is not provided.

In the embodiment, the base 21 has a configuration in which a surface of a base member that constitutes an exterior of the base 21 is covered with a coating material. An insulating resin material (for example, an ABS resin, polypropylene, or the like) is used in the base member. The coating material is formed by plating a metal material formed of, for example, aluminum or the like. Further, the base 21 may be formed of an arbitrary material.

The handle main body 22 constitutes a portion from a front end to the rear of the central section in the forward/rearward direction. A rear end portion of the handle main body 22 is smoothly connected to a front end portion of the base 21.

The handle main body 22 is connected to the door 3 to be pivotable about a pivot shaft extending in the upward/downward direction using the front end portion of the handle main body 22 as a support point. That is, the handle main body 22 is pivoted away in the vehicle width direction using the front end portion of the handle main body 22 as a support point by pulling the handle main body 22 outward in the vehicle width direction while gripping a central section in the forward/rearward direction. Accordingly, in an unlocking state of the door lock mechanism, locking of a door latch mechanism (not shown) is released such that the door 3 can be moved to an opening position. A concave section 31 recessed inward in the vehicle width direction is formed at a position of the outer panel 4 facing the central section of the handle main body 22 in the forward/rearward direction. An insertion space into which a hand or the like is inserted when the handle main body 22 is gripped is disposed between a surface of the handle main body 22 facing inward in the vehicle width direction and an inner surface of the concave section 31.

Figure 2:
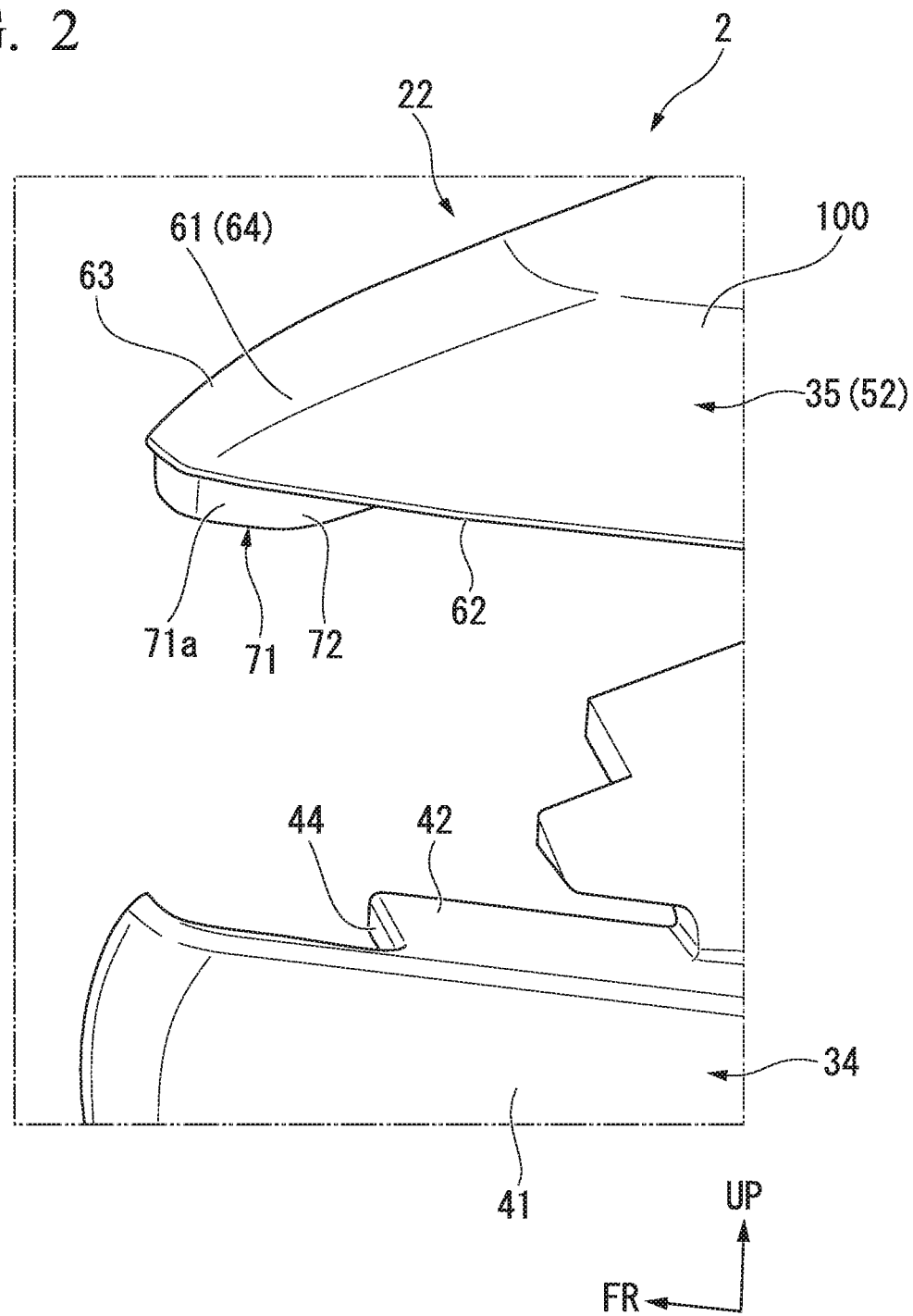
FIG. 2 is an exploded perspective view showing a front section of a handle main body.

FIG. 2 is an exploded perspective view showing a front section of the handle main body 22.

As shown in FIG. 2, the handle main body 22 includes a case 34 and a sensor cover (a decoration member) 35, which are split in the upward/downward direction.

The case 34 constitutes a portion from a lower end of the handle main body 22 to above the central section in the upward/downward direction. The case 34 has a configuration in which a surface of the base member that constitutes an exterior of the case 34 is covered with a coating material. Further, the same material may be used for the base member or the coating material and the above-mentioned base 21.

The case 34 has an outer wall section 41 that constitutes an outer surface of the door handle 2, and an inner wall section 42 covered with the sensor cover 35.

The inner wall section 42 extends inward in the vehicle width direction from an upper end portion of the outer wall section 41. An accommodating port 44 passing through the inner wall section 42 in the upward/downward direction is formed in the front end portion of the inner wall section 42.

As shown in FIG. 1, the sensor cover 35 is assembled to the case 34 in a state in which the inner wall section 42 of the case 34 is covered with the sensor cover 35 from above. A lower end portion of the sensor cover 35 is smoothly connected to an upper end portion of the case 34 (the outer wall section 41).

A detection member 11 configured to detect presence of a user's hand or the like is installed in the case 34. The detection member 11 is, for example, a sensor electrode that constitutes a capacitive sensor. That is, the detection member 11 detects a variation in capacitance as a user's hand or the like approaches or abuts the handle main body 22. The detection member 11 outputs a detection signal toward a control unit (not shown) when the variation in capacitance is detected. The control unit determines that a user's hand or the like approaches the handle main body 22 when the variation in capacitance exceeds a threshold. In addition, the control unit performs communication with an electronic key that is carried by a user, and performs certification of whether ID of the electronic key coincides with ID of the vehicle. When the certification is correctly performed, the control unit outputs a locking command to a door lock mechanism.

Here, the sensor cover 35 is formed by pasting a film material 110 (see FIG. 5 or the like) on a surface (a design surface) of a base member 100 that constitutes an exterior of the sensor cover 35 through TOM. In this case, a resin material having the same insulation as that of the base 21 or the like is used in the base member 100. For example, a metallic sheet formed by laminating a resin layer with a metal layer sandwiched therebetween is used in the film material 110. Polycarbonate (PC), polyethyleneterephthalate (PET), or the like, is appropriately used in the resin layer. Meanwhile, an overlayer of In, Sn, or the like is used in the metal layer. The metal layer has a sea-island structure in which metal particles are independent from each other. Accordingly, the film material 110 has radio wave transmissivity and insulation as a whole. Further, in FIG. 1 to FIG. 4, illustration of the film material 110 is omitted. That is, parts of the sensor cover 35 described below are formed of the base member 100.

Figure 7:
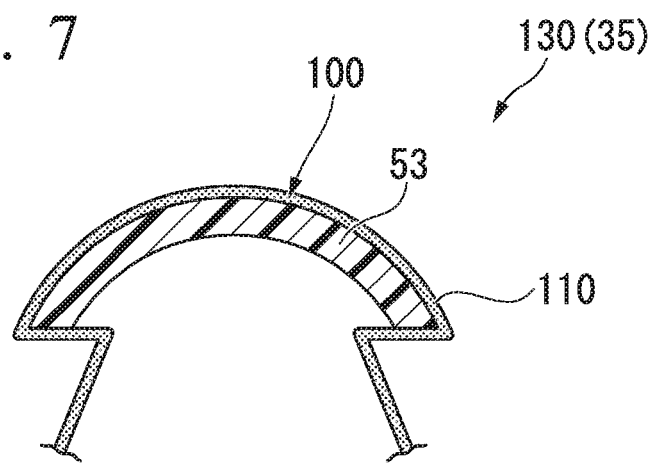
FIG. 7 is a cross-sectional view taken along line VII-VII in FIG. 6.

The sensor cover 35 is formed in an arch shape that swells outward in the vehicle width direction when seen in a plan view in the upward/downward direction, and formed in an arch shape that swells upward when seen in a lateral cross-sectional view in the upward/downward direction (see FIG. 7 or the like). Specifically, the sensor cover 35 has a rear-side connecting section 51, a front-side connecting section 52, and a bridge section 53 configured to bridge the connecting sections 51 and 52.

The front-side connecting section 52 has a triangular shape that is tapered forward in a plan view. That is, a front end portion of the front-side connecting section 52 constitutes an edge portion 61 that sharpens forward. As shown in FIG. 2, the edge portion 61 has a lower side portion 62 extending to follow an upper edge of the case 34 (the outer wall section 41), an upper side portion 63 extending to follow an outer surface of the outer panel 4, and a curved section 64 that connects the side portions 62 and 63.

The lower side portion 62 constitutes a lower end portion of the edge portion 61. A lower surface of the lower side portion 62 faces the case 34 in a state in which the case 34 and the sensor cover 35 are assembled. The lower side portion 62 extends in a linear shape in the forward/rearward direction when seen in a side view, and extends while being curved inward in the vehicle width direction as it goes forward when seen in a plan view.

The upper side portion 63 constitutes an upper end portion of the edge portion 61. A surface of the upper side portion 63 facing inward in the vehicle width direction faces the outer panel 4 when the door handle 2 is attached to the door 3. The upper side portion 63 extends while being curved downward as it goes forward when seen in a side view, and extends in a linear shape in the forward/rearward direction when seen in a plan view. A front end portion of the upper side portion 63 intersects a front end portion of the lower side portion 62.

The curved section 64 extends while being curved between the side portions 62 and 63, and is smoothly connected to an outer surface of the outer wall section 41.

An angle θ formed between the side portions 62 and 63 is formed at a front end portion of the edge portion 61 at an acute angle (less than 90°). Further, in the embodiment, the angle θ is an angle formed between a first straight line extending in a tangential direction of the lower side portion 62 along a lower edge of the lower side portion 62 through an apex section of the edge portion 61 (an intersection between the side portions 62 and 63) and a second straight line extending in the tangential direction of the upper side portion 63 along an upper edge of the upper side portion 63 through the apex section of the edge portion 61. However, the edge portion 61 is acceptable as long as an angle formed between two straight lines passing through the apex section in a direction of any one of a plan view and side view and extending in the tangential direction of the two side portions 62 and 63 that form an apex is an acute angle. In addition, the apex section of the edge portion 61 may be rounded.

Figure 3:
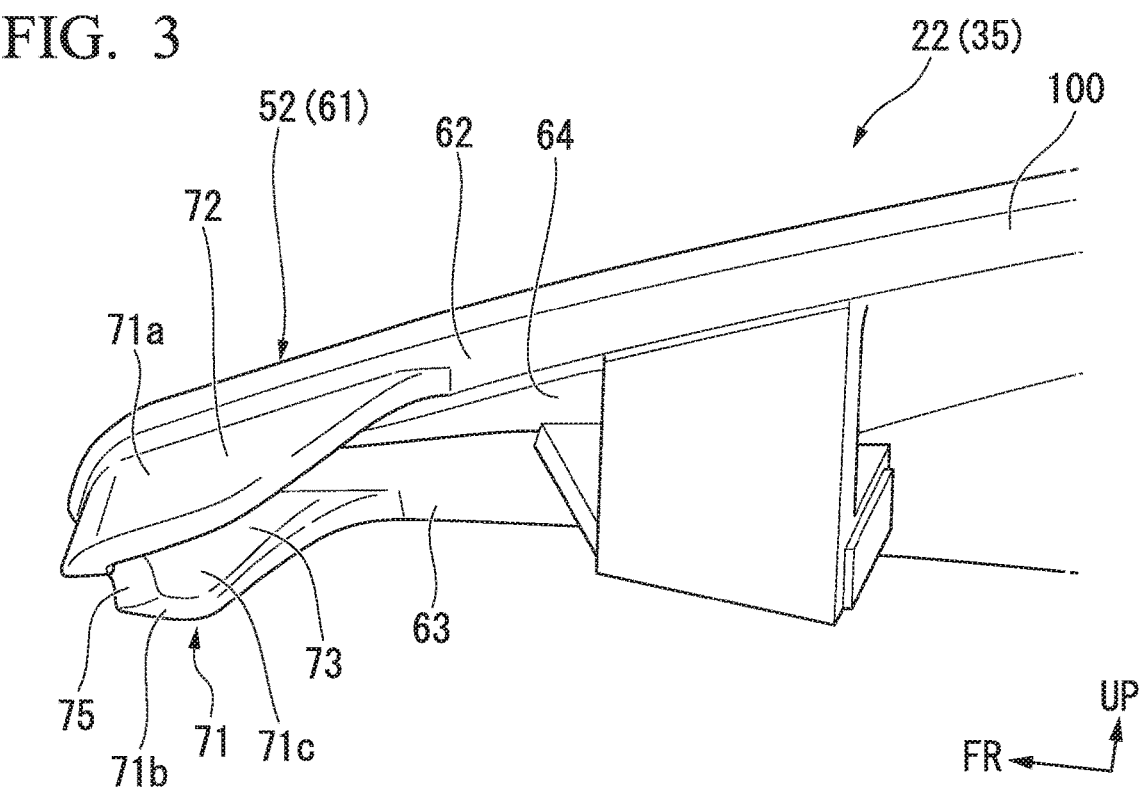
FIG. 3 is a perspective view showing an edge portion from below.

FIG. 3 is a perspective view showing the edge portion 61 from below.

As shown in FIG. 3, a paste wall section 71 protruding downward (away from the surface of the sensor cover 35) is formed on each of the side portions 62 and 63 of the edge portion 61. The paste wall section 71 is formed in a V shape that is tapered forward when seen in a plan view from below. Specifically, the paste wall section 71 is formed by connecting front end portions of a lower wall section 72 extending to follow the lower side portion 62 and an upper wall section 73 extending to follow the upper side portion 63.

The lower wall section 72 extends forward in a linear shape after a protrusion amount downward from the lower side portion 62 gradually increases forward. An outer side surface (a surface facing outward in the vehicle width direction) of the lower wall section 72 is disposed inside in the vehicle width direction with respect to an outer circumferential edge of the sensor cover 35.

The upper wall section 73 extends forward in a linear shape after a protrusion amount downward from the upper side portion 63 gradually increases forward.

Figure 4:
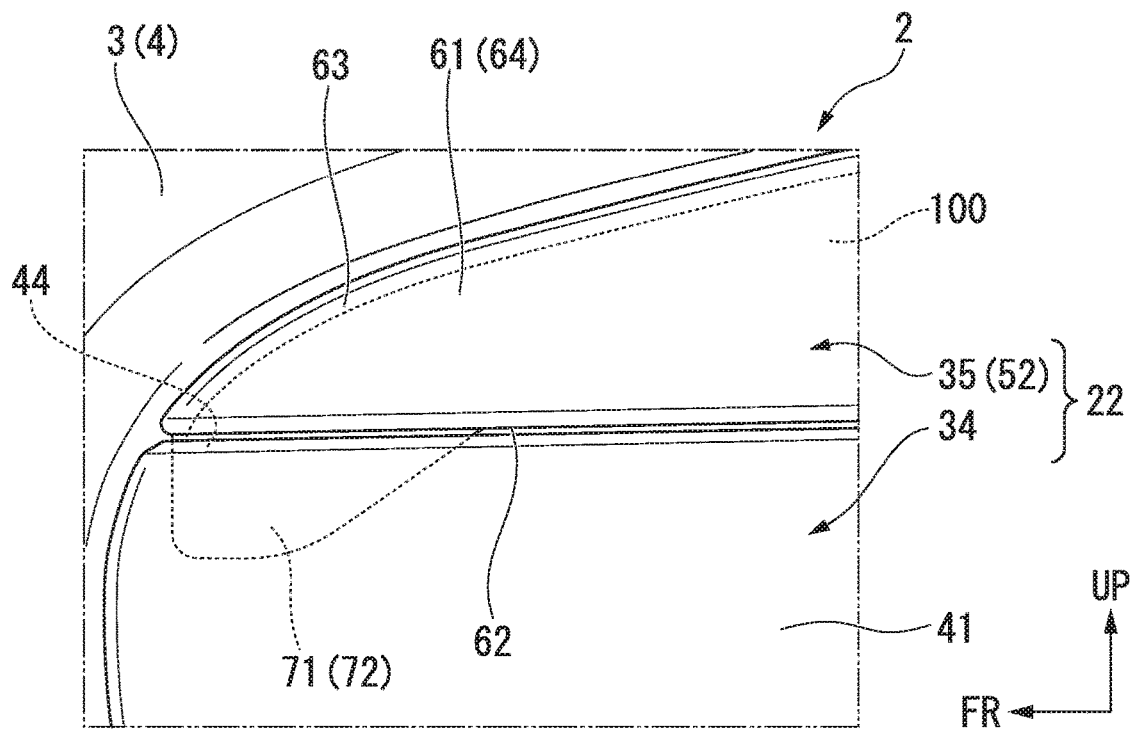
FIG. 4 is a side view showing a front end portion of a handle main body.

FIG. 4 is a side view showing a front end portion of the handle main body 22.

As shown in FIG. 4, the paste wall section 71 is accommodated in the accommodating port 44 of the case 34 in a state in which the case 34 and the sensor cover 35 are assembled. Accordingly, interference between the paste wall section 71 and the inner wall section 42 of the case 34 is prevented.

Further, a design change of the paste wall section 71 is possible as long as the paste wall section 71 protrudes from at least the apex section of the edge portion 61 or the vicinity of the apex section. In this case, a dimension (for example, a formation range, a height, or the like, in the forward/rearward direction) of each of the wall sections 72 and 73 can be appropriately changed. In addition, the wall sections 72 and 73 may be separated from each other. Further, the paste wall section 71 is not limited to a configuration that bifurcates from the apex section of the edge portion 61 (each of the wall sections 72 and 73). For example, the paste wall section 71 may have a configuration having at least one of the wall sections 72 and 73 or a configuration extending in a columnar shape from the apex section of the edge portion 61.

As shown in FIG. 3, a notch 75 is formed in the apex section of the paste wall section 71 (a connecting portion of the wall sections 72 and 73). The notch 75 is recessed upward from a lower surface 71b of the paste wall section 71. Specifically, a depth of the notch 75 gradually increases toward the apex section of the paste wall section 71. Further, a formation position of the notch 75 on the paste wall section 71, a shape of the notch 75, or the like may be appropriately varied.

[Method of Manufacturing Sensor Cover]

Figure 5:
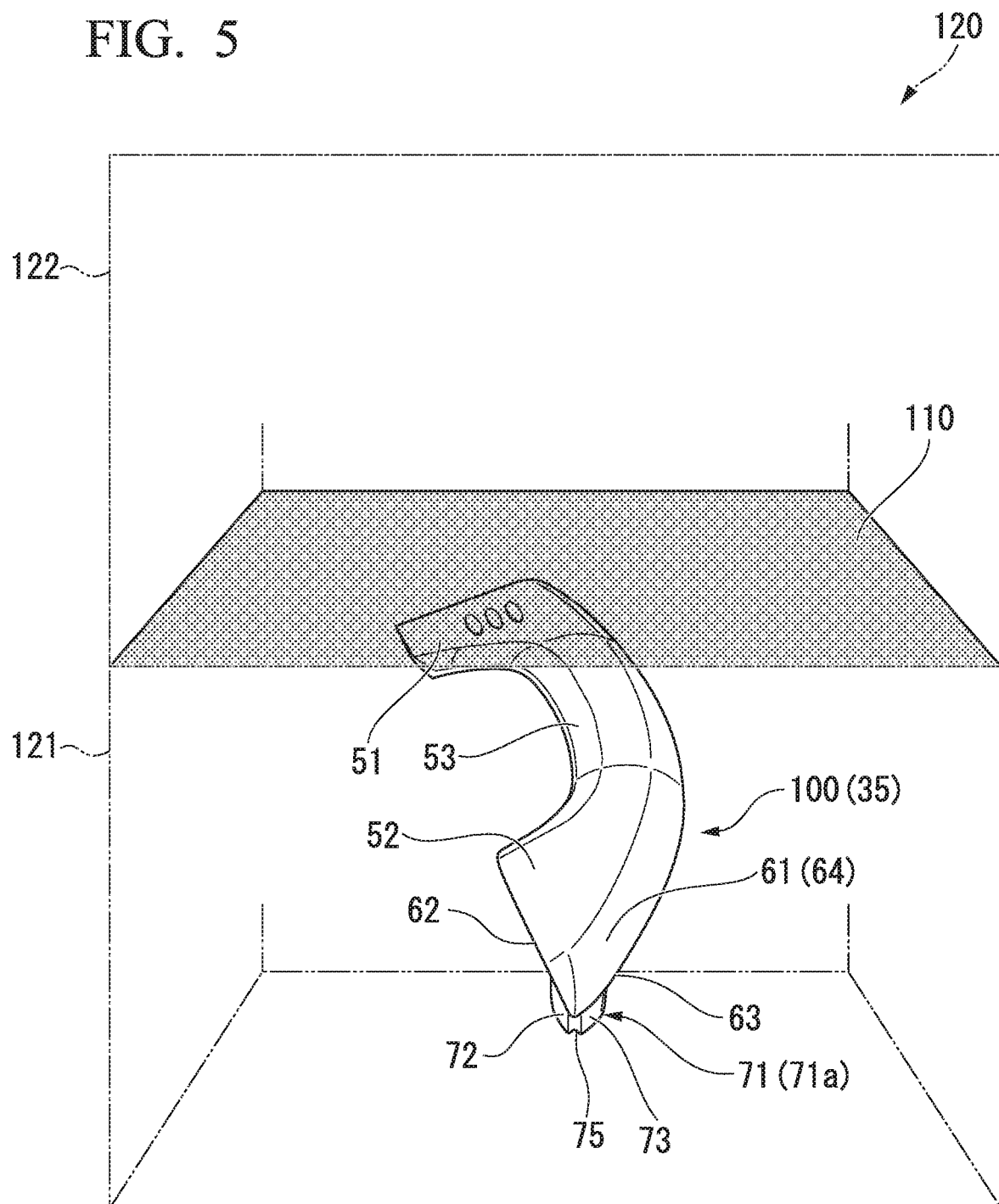
FIG. 5 is a process view for explaining a method of manufacturing a sensor cover.
Figure 6:
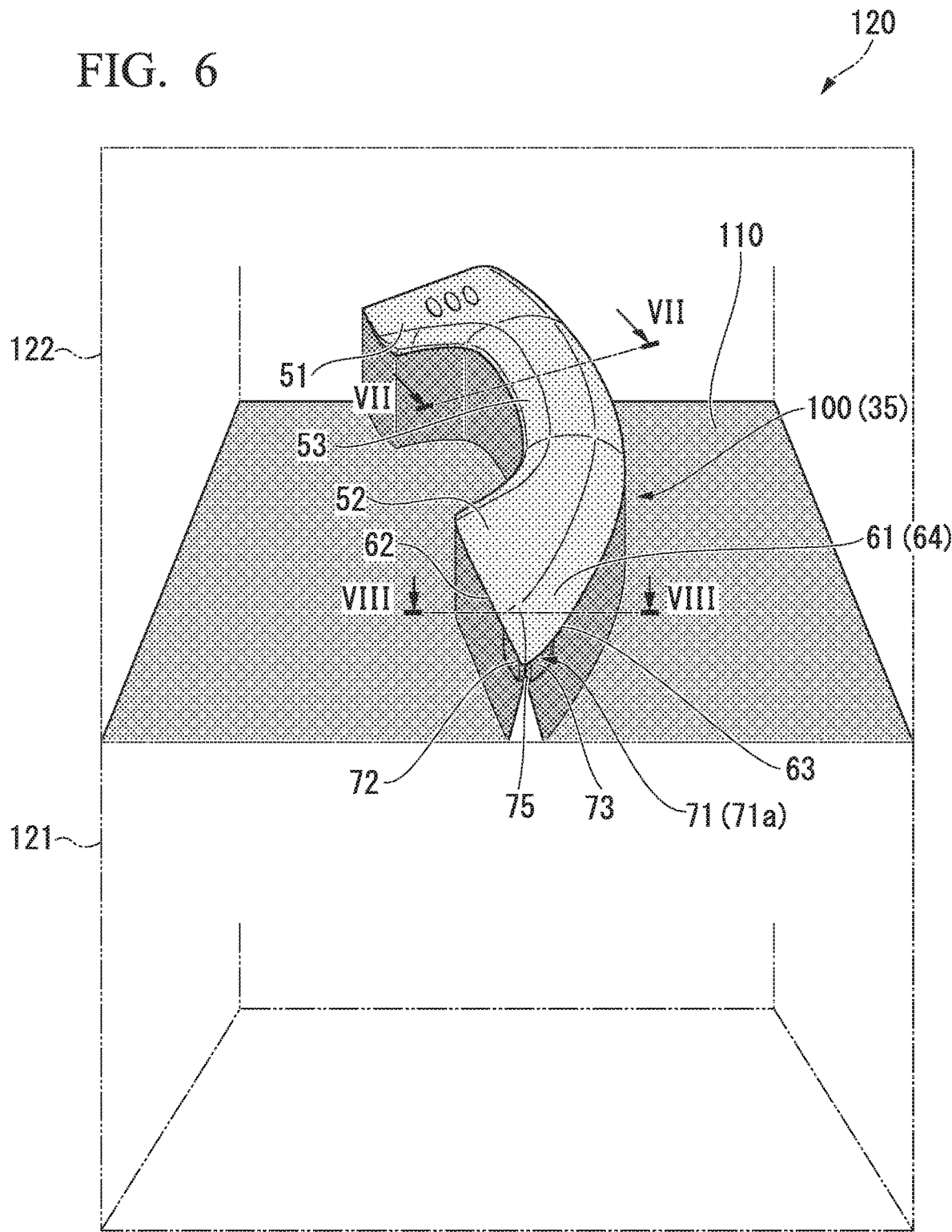
FIG. 6 is a process view for explaining a method of manufacturing a sensor cover.

Next, a method of manufacturing the above-mentioned sensor cover 35 will be described. FIG. 5 and FIG. 6 are process views for explaining the method of manufacturing the sensor cover 35. In the following description, in the method of manufacturing the sensor cover 35, a method of pasting the film material 110 on the base member 100 through TOM will be mainly described. Further, the base member 100 constitutes the exterior of the sensor cover 35 as described above. Accordingly, in the drawings after FIG. 5, reference numerals corresponding to the parts of the sensor cover 35 are attached to those of the base member 100.

As shown in FIG. 5, the base member 100 and the film material 110 are set in a forming apparatus 120 (a setting process). Specifically, the film material 110 is set to partition a space between a first chamber 121 and a second chamber 122 in communication with each other, and the base member 100 is set on an elevation table (not shown) disposed in the first chamber 121. Here, the base member 100 is set in a state in which a surface of the base member 100 (a design surface exposed to the outside of the vehicle in a state in which the sensor cover 35 is assembled) is directed toward the film material 110.

Then, the insides of the chambers 121 and 122 are decompressed (a decompression process).

Next, the film material 110 is heated to a predetermined temperature (a film heating process).

After that, as shown in FIG. 6, the elevation table is raised, and the surface of the base member 100 is pushed against the film material 110 (a raising process).

Then, the film material 110 is closely attached to the base member 100 (a pressure forming process). Specifically, in a state in which a reduced-pressure atmosphere is maintained in the first chamber 121, a pressure in the second chamber 122 is increased. Then, the film material 110 is closely attached to the surface of the base member 100 by a pressure difference between the first chamber 121 and the second chamber 122.

FIG. 7 is a cross-sectional view of a portion taken along line VII-VII in FIG. 6.

Here, in the above-mentioned pressure forming process, the film material 110 closely attached to the surface of the base member 100 goes around a back surface of the base member 100 (a surface that is not exposed to the outside of the vehicle in a state in which the sensor cover 35 is assembled (a surface facing a side opposite to a design surface)) via an outer circumferential edge of the base member 100. As shown in FIG. 7, in a portion of the base member 100 other than the edge portion 61 (for example, the bridge section 53 or the like), the film material 110 is also closely attached to the back surface of the base member 100.

Figure 8:
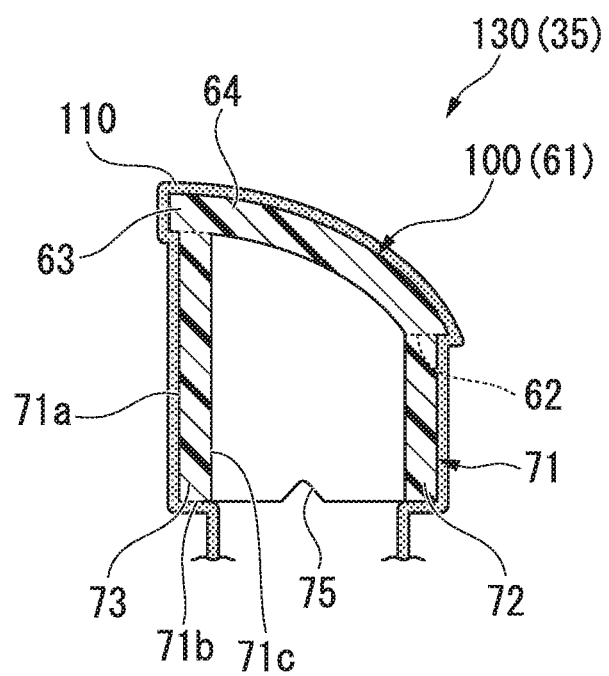
FIG. 8 is a cross-sectional view taken along line VIII-VIII in FIG. 6.

FIG. 8 is a cross-sectional view of a portion taken along line VIII-VIII in FIG. 6.

Meanwhile, as shown in FIG. 8, the paste wall section 71 is closely attached to the edge portion 61 of the base member 100 in a process in which opposing portions of the film material 110 going around the back surface of the base member 100 (each of the side portions 62 and 63) with the edge portion 61 sandwiched therebetween move toward each other. Specifically, the film material 110 goes around the lower surface 71b of the paste wall section 71 and is closely attached to the lower surface 71b of the paste wall section 71 after being closely attached to an outer side surface 71a of the paste wall section 71. Accordingly, a molded body 130 in which the base member 100 is covered with the film material 110 can be formed.

Next, the film material 110 is trimmed and the molded body 130 is retrieved from the film material 110 (a trimming process). Here, the film material 110 is trimmed such that a part of the film material 110 pasted to the back surface of the base member 100 or the paste wall section 71 remains on the molded body 130 as a pasting margin.

Next, the pasting margin of the film material 110 is bonded to the back surface of the base member 100 or the paste wall section 71 through thermo-compression bonding. Here, when a part of the film material 110 disposed at both sides with the apex section of the paste wall section 71 sandwiched therebetween sticks out of the outer side surface 71a of the paste wall section 71 or the lower surface 71b in an overlapping state, the sticking out portion of the film material 110 is accommodated in the notch 75 of the paste wall section 71 by folding the sticking out portion inward. After that, the pasting margin is bonded as a whole through thermo-compression bonding. Here, a part of the pasting margin sticking out of the outer side surface 71a of the paste wall section 71 or the lower surface 71b may be folded inside the paste wall section 71 and crimped on an inner side surface 71c of the paste wall section 71. Finally, in order to remove any small portions that are sticking out, laser cutting along the side portions 62 and 63 of the sensor cover 35 is performed and the sensor cover 35 is completed.

In this way, in the embodiment, a configuration in which the paste wall section 71 protruding away from the surface of the base member 100 is formed on the edge portion 61 of the base member 100 is provided.

According to this configuration, for example, when the film material 110 is pasted on the base member 100 through TOM, the film material 110 that goes around to the back surface of the base member 100 on the edge portion 61 is closely attached to the paste wall section 71. Accordingly, even when an overlapping portion of the film material 110 on the edge portion 61 occurs, the overlapping portion can be kept away from the outer circumferential edge of the base member 100.

For this reason, even when the sensor cover 35 is exposed to a high temperature and high humidity environment or the like and exfoliation of the film material 110 occurs, progress of the exfoliation of the film material 110 to the surface of the base member 100 on the edge portion 61 can be suppressed. As a result, occurrence of exterior inferiority can be suppressed and a yield rate can be improved.

In the embodiment, a configuration in which the notch 75 is formed in the paste wall section 71 is provided.

According to this configuration, after trimming of the film material 110, even when the portion of the film material 110 sticking out of the paste wall section 71 remains, the sticking out portion can be accommodated in the notch 75. Accordingly, when the sticking out portion is bonded to the base member 100 through thermo-compression bonding or the like, the sticking out portion is easily pasted on the base member 100.

In the embodiment, a configuration in which the base member 100 and the film material 110 are formed of an insulating material is provided.

According to this configuration, the sensor cover 35 can suppress an influence on sensitivity of the detection member 11.

In the embodiment, as the decoration member according to the present invention is employed in the sensor cover 35 of the door handle 2, the door handle 2 having a high yield rate with a good appearance can be provided.

In particular, in the embodiment, in the door handle 2, a surface of the sensor cover 35 is formed of the film material 110 constituted by a metallic sheet, and a surface of the portion other than the sensor cover 35 is formed through plating. Accordingly, a glossy exterior of the door handle 2 as a whole can be obtained while securing sensitivity of the detection member 11. As a result, the door handle 2 having a good design can be provided.

While an embodiment of the present invention has been described above in detail with reference to the accompanying drawings, a specific configuration is not limited to the embodiment and a design change or the like may be made without departing from the spirit of the present invention.

For example, while the configuration in which the door handle 2 has the base 21 and the handle main body 22 has been described in the above-mentioned embodiment, embodiments are not limited to this configuration. The configuration of the door handle 2 can be appropriately changed as long as an edge portion is provided on at least a part of the door handle 2. For example, while the configuration in which the handle main body 22 is constituted by the case 34 and the sensor cover 35 has been described in the above-mentioned embodiment, embodiments are not limited to this configuration and the handle main body 22 may be integrally formed.

While the configuration in which only the sensor cover 35 is formed through the TOM has been described in the above-mentioned embodiment, embodiments are not limited to this configuration and the base 21 or the case 34 may be formed through the TOM.

While the configuration in which the film material 110 is pasted on the outer side surface 71a and the lower surface 71b of the paste wall section 71 has been described in the above-mentioned embodiment, embodiments are not limited to this configuration. That is, the film material 110 may be pasted on the paste wall section 71.

While the configuration in which the film material 110 is pasted on the base member 100 through the TOM has been described in the above-mentioned embodiment, embodiments are not limited to this configuration. For example, the configuration of the present invention can be employed even when the film material and the molded body (the base member) are formed integrally with each other through film in-mold molding.

While the case in which the decoration member according to the present invention is employed to the door handle 2 has been described in the above-mentioned embodiment, embodiments are not limited to this configuration. For example, the configuration of the present invention may be employed to a housing of an electronic key, a front grille for a vehicle, a decoration member of a tailgate, interior parts, or the like.

While the case in which the paste wall section 71 is formed on only a portion of the base member 100 corresponding to the edge portion 61 has been described in the above-mentioned embodiment, embodiments are not limited to this configuration and the paste wall section 71 may be formed on a portion including at least the edge portion 61.

While preferred embodiments of the invention have been described and illustrated above, it should be understood that these are exemplary of the invention and are not to be considered as limiting.

What is claimed is:

1. A decoration member comprising:
   a base member having a design surface; and
   a film material that covers the design surface,
   wherein the base member has an edge portion that sharpens toward a tip portion in a longitudinal direction of the design surface, and
   a paste wall section on which the film material is able to be pasted and which protrudes away from the design surface is provided on a surface of the edge portion opposite to the design surface, and
   opposing portions of the film material are pasted on the base member sandwiching the edge portion and the paste wall section.

2. The decoration member according to claim 1, wherein a notch that is cut out toward the design surface is formed in the paste wall section.

3. The decoration member according to claim 1, wherein the base member and the film material are formed of an insulating material.

4. A door handle for a vehicle installed on a door for a vehicle,
   wherein the decoration member according to claim 1 is installed on a surface of the door handle.

5. A decoration member comprising:
   a base member having a design surface; and
   a film material that covers the design surface,
   wherein the base member has an edge portion that sharpens toward a tip portion when seen in a normal direction of the design surface,
   a paste wall section on which the film material is able to be pasted while protruding away from the design surface is formed on a surface of the edge portion opposite to the design surface, and
   a notch that is cut out toward the design surface is formed in the paste wall section.

* * * * *